United States Patent [19]

Cruickshank

[11] Patent Number: 4,953,766

[45] Date of Patent: Sep. 4, 1990

[54] HEADGEAR CAMERA MOUNT

[76] Inventor: Thomas R. Cruickshank, 6431 Askeland Dr., Anchorage, Ak. 99507

[21] Appl. No.: 430,868

[22] Filed: Oct. 31, 1989

[51] Int. Cl.⁵ .......................... A42B 1/24; G03B 29/00
[52] U.S. Cl. .................................... 224/181; 224/908; 2/6; 2/422; 354/82
[58] Field of Search ....................... 224/181, 908, 909; 2/6, 421, 422, 425, 418–420; 354/82, 81; 350/143; 351/206, 245; 352/242, 243; 358/210, 229; 128/207.11, 21–23, 200.27, 200.28, 201.22, 201.24, 206.27

[56] References Cited

U.S. PATENT DOCUMENTS

| | | | |
|---|---|---|---|
| 1,605,725 | 11/1926 | Herbert, Jr. | 351/206 |
| 1,691,733 | 11/1928 | Nordin | 354/81 |
| 1,907,437 | 5/1933 | Nopper | 352/242 |
| 2,270,931 | 1/1942 | Corcoran | 224/181 X |
| 2,369,829 | 2/1945 | Johnson | 224/181 |
| 2,711,122 | 6/1955 | Klumpp | 354/82 X |
| 3,110,900 | 11/1963 | Crowdes, Jr. | 2/419 |
| 3,139,014 | 6/1964 | Byrne | 354/82 |
| 3,236,578 | 2/1966 | Mackworth et al. | 351/206 |
| 3,249,271 | 5/1966 | Allbritton | 224/181 |
| 3,542,457 | 11/1970 | Balding et l. | 351/206 |
| 3,919,475 | 11/1975 | Dukich et al. | 358/210 |
| 4,270,679 | 6/1981 | Gildea et al. | 224/181 |
| 4,549,542 | 10/1985 | Chien | 128/201.24 |
| 4,697,783 | 10/1987 | Kastendieck et al. | 224/181 X |
| 4,703,879 | 11/1987 | Kastendieck et al. | 224/181 |
| 4,797,736 | 1/1989 | Kloots et al. | 358/229 X |

Primary Examiner—Henry J. Recla
Assistant Examiner—Casey Jacyna
Attorney, Agent, or Firm—Norman B. Rainer

[57] ABSTRACT

A headgear device is provided for the mounting of a camera at substantially eye level alongside the photographer's head. The device is comprised of a frame having an arcuate portion that fits on top of the photographer's head, a side panel that rests against his ear, and shelf panel extending horizontally outward from the side panel. Straps which fit behind the head, below the chin, and upon the forehead secure the device upon the photographer's head. A positionable mounting screw holds the camera upon the shelf panel.

10 Claims, 3 Drawing Sheets

4,953,766

HEADGEAR CAMERA MOUNT

BACKGROUND OF THE INVENTION

This invention relates to mounting means for a camera, and more particularly concerns apparatus to be worn upon a person's head for the purpose of mounting a camera substantially at eye level.

Many sportsmen would like to take still or moving pictures of their sport from the point of view of the individual engaging in the sport. For example, a skier would like pictures as he skied down a trail, a motorcyclist would take pictures while driving along a trail, a parachutist would take pictures while airborne, and an underwater diver would take pictures during submerged swimming.

Helmet head harnesses and other headgear structures having mounting means for cameras are disclosed in U.S. Pat. Nos. 3,139,014; 2,369,829; and 4,270,679. In such structures, the camera is positioned atop the head; and there is little versatility as to the nature of the camera which may be utilized. The mounting of a camera above the head has been found however, to impede the sportsman's head mobility, and undesirably elevates the sportsman's center of gravity. Also, the above-the-head camera location causes aiming uncertainties and difficult accessibility for manipulation of camera controls.

Optical devices adapted to be mounted upon headgear for eye level viewing are disclosed in U.S. Pat. Nos. 4,703,879; 3,919,475; and 3,236,578. Such headgear devices however, would not be useful to a sportsman engaged in an activity requiring full normal vision.

It is accordingly an object of the present invention to provide headgear for mounting a camera.

It is another object of this invention to provide headgear as in the foregoing object which disposes the camera at substantially eye level.

It is a further object of the present invention to provide headgear of the aforesaid nature which can accommodate a variety of different cameras.

It is a still further object of this invention to provide headgear of the aforesaid nature wherein a camera mounted therein is easily accessible while the headgear is worn by the user.

It is yet another object of the present invention to provide headgear of the aforesaid nature which is easily and adjustably worn, and of simple construction amenable to low cost manufacture.

These objects and other objects and advantages of the invention will be apparent from the following description.

SUMMARY OF THE INVENTION

The above and other beneficial objects and advantages are accomplished in accordance with the present invention by a headgear device comprising:

(a) a monolithic frame having an elongated arcuate portion adapted to fit over the top of the wearer's head, a flat side panel emergent from said arcuate portion as a continuous integral extension thereof and in a manner permitting resilient movement of said arcuate portion, and a shelf panel perpendicularly and rigidly emergent from the lowermost extremity of said side panel and adapted to be disposed in a horizontal orientation, said shelf panel having a positioning slot elongated in the direction of said side panel and a threaded bolt adapted to move within said positioning slot, and strap-holding slots disposed within said side panel and arcuate portion, (b) a first retaining strap of adjustable length adapted to lie against the wearer's forehead and engaging said strap-holding slots, (c) a second retaining strap of adjustable length adapted to lie against the rear of the wearer's head and engaging said strap-holding slots, and (d) a third retaining strap of adjustable length adapted to lie beneath the chin of the wearer and engaging said strap-holding slots.

In preferred embodiments, the frame is produced by the bending of flat sheet stock of plastic or light-weight metal such as aluminum. The frame may also be produced by molding methods. The resiliency of the arcuate portion with respect to the side panel may be achieved by perforations located adjacent the upper extremity of the side panel, namely in the region where the side panel merges with the arcuate portion. The side panel is adapted to rest against the ear of the wearer and may be suitably padded on its inwardly directed surface, namely the surface directed toward the wearer. Similarly, the arcuate portion may contain padding on its lower, inwardly directed surface. The arcuate portion extends between a proximal extremity that merges with said side panel, and a downwardly located free distal extremity. The amount of curvature in the arcuate portion is about 180 degrees, whereby the proximal and distal extremities are disposed in diametrically opposed facing relationship.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
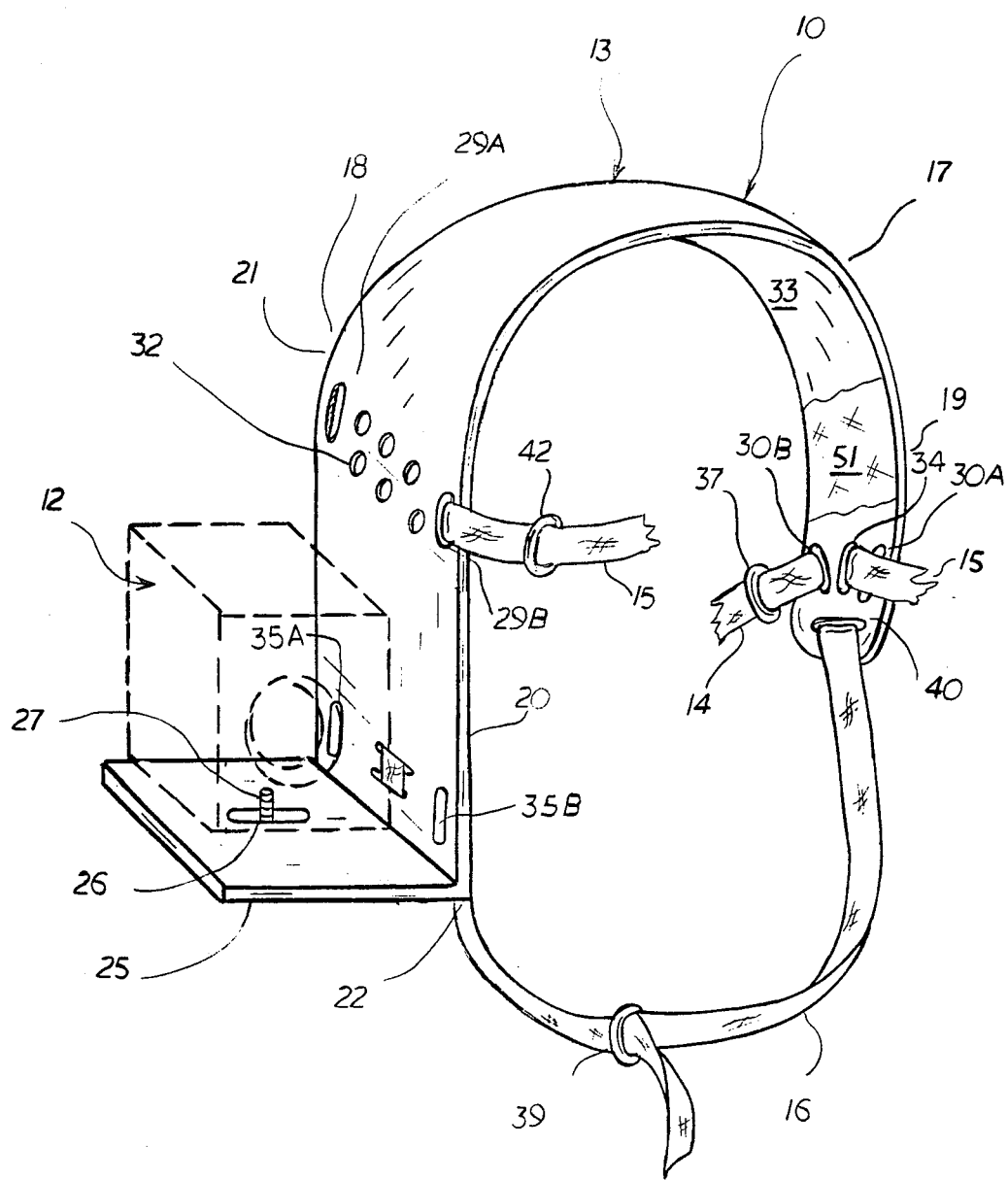
FIG. 1 is a front perspective view of an embodiment of the headgear of this invention shown in functional engagement with a camera.
Figure 2:
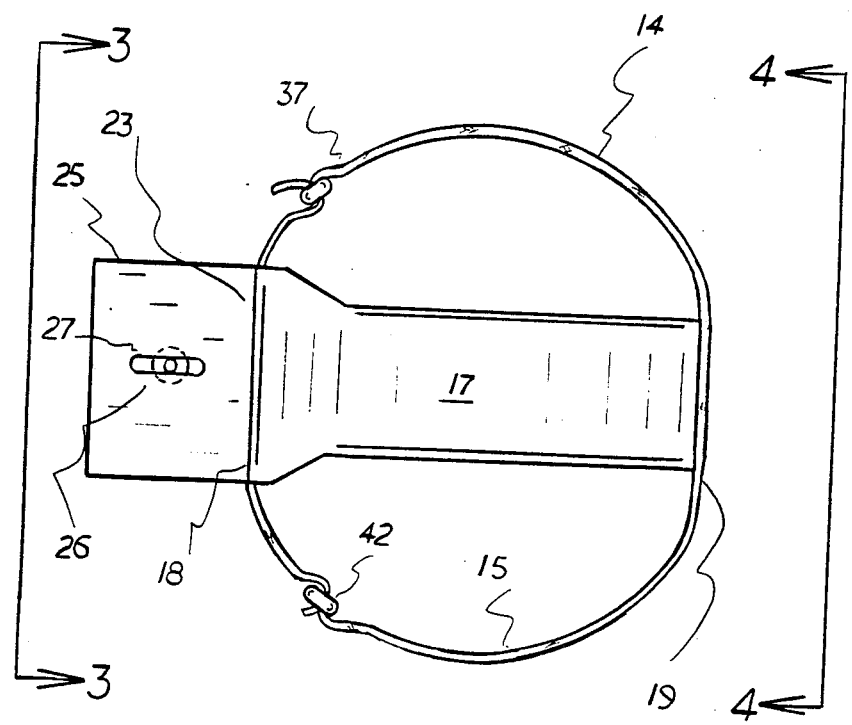
FIG. 2 is a top view of the headgear of FIG. 1.
Figures 3, 4:
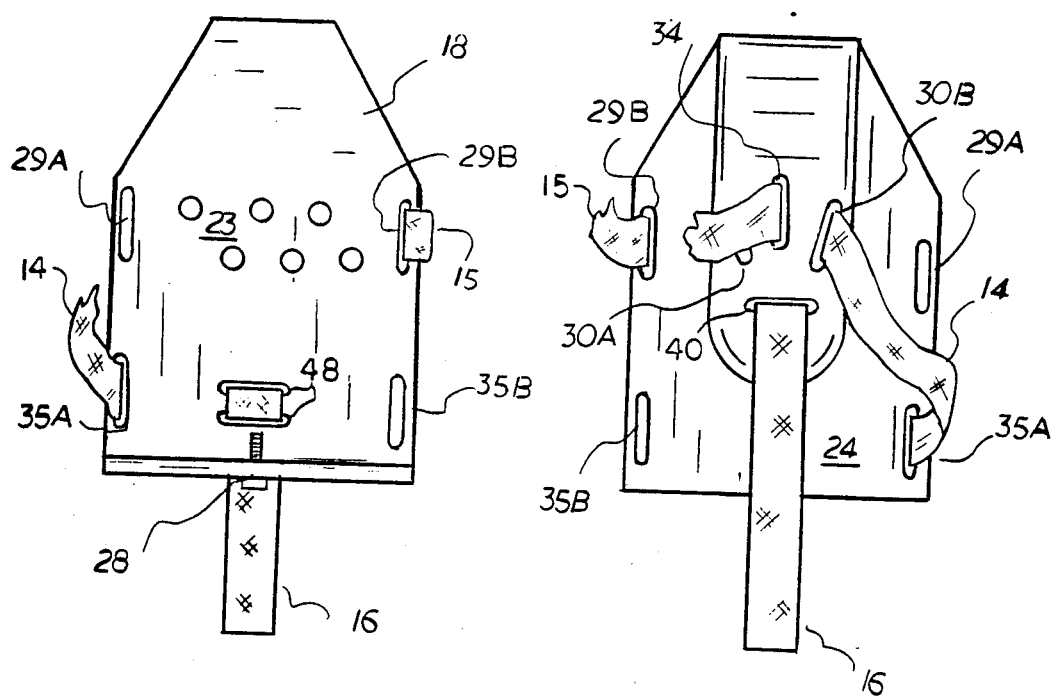
FIG. 3 is a left side view of the headgear of FIG. 1.
FIG. 4 is a right side view of the headgear of FIG. 1.

Referring to FIGS. 1-4, an embodiment of the headgear 10 of the present invention is shown as it would be emplaced upon the wearer's head, and supporting a camera 12.

Headgear 10 is comprised of frame 13 and interactive first, second and third retaining straps 14, 15 and 16, respectively. Frame 13, of monolithic construction, is comprised of elongated arcuate portion 17 extending from proximal extremity 18 to free distal extremity 19. The arcuate portion, which is upwardly convex, has an approximately circular curvature, extending for about 180 degrees of circular arc.

Flat side panel 20 is downwardly emergent from the proximal extremity 18 of the arcuate portion as a continuous integral extension thereof. Said side panel is of substantially flat configuration, having upper extremity 21, lower extremity 22, outer surface 23, and inwardly directed surface 24 which may contain a layer of foam rubber padding similar to cushioning 51.

Shelf panel 25 is perpendicularly emergent from side panel 20 at lower extremity 22, forming therewith a rigid bracket structure. The shelf and side panels of the exemplified embodiment are of substantially rectangular contour. However, other contours of said panels may be utilized in alternative equivalent embodiments.

A positioning slot 26, elongated in the direction of side panel 20, is disposed within shelf panel 25. A threaded bolt 27, having downwardly directed head 28, is slidably retained within slot 26, said bolt being adapted to engage a tripod socket conventionally located in the bottom of cameras. By virtue of the sliding adjustability provided by slot 26 and interactive bolt 27, the camera can be positioned so that its side extremity rests in abutment with side panel 20, thereby providing greater stability of the camera mounted upon shelf panel 25.

Upper vertical strap-holding slots 29A and 29B are disposed adjacent the upper extremity of side panel 20 and adjacent the lateral edges thereof. Lower vertical strap-holding slots 35A and 35B are disposed adjacent the lower extremity of panel 20 and in vertical alignment with slots 29A and 29B. A first pair of horizontal slots 48 is disposed in panel 20 midway between slots 35A and 35B.

A series of holes 32 are formed within side panel 20 adjacent upper extremity 21. The purpose of the holes is to cause some structural weakness which permits some flexural resiliency of the arcuate portion with respect to side panel 20. Adhered to the inwardly directed surface 33 of arcuate portion 17 is foam rubber cushioning 51 or equivalent material which provides wearing comfort. Paired diagonal strap-holding slots 30A and 30B are disposed in distal extremity 19 of arcuate portion 17, and vertical strap-holding slot 34 is centered between slots 30A and 30B. A second pair of horizontally disposed strap-holding slots 40 is centered below slot 34.

With the camera on the right side of the wearer's head, as shown in FIGS. 1-4, a first retaining strap 15, having length-adjusting buckle 42, engages slots 29B and 34. In such manner of engagement, strap 15 presses against the wearer's forehead.

A second, or rear retaining strap 14, having length adjusting buckle 37, engages slots 30B and 35A. In such manner of engagement strap 14 presses against the rear of the wearer's head. Buckle 37 preferably has a snap apart construction, enabling strap 14 to be quickly emplaced or removed.

A third retaining strap, chin strap 16, having length-adjusting buckle 39, engages first and second paired horizontally disposed slots 48 and 40, respectively. In such manner of engagement, strap 11 presses upwardly against the underside of the wearer's chin. Buckle 39 is preferably of a snap-apart construction.

To mount the camera on the wearer's left side, the forehead strap would engage slots 29A and 34. Similarly, the rear retaining strap 14 would engage slots 30A and 29B. The chin strap would remain as previously described.

Figure 5:
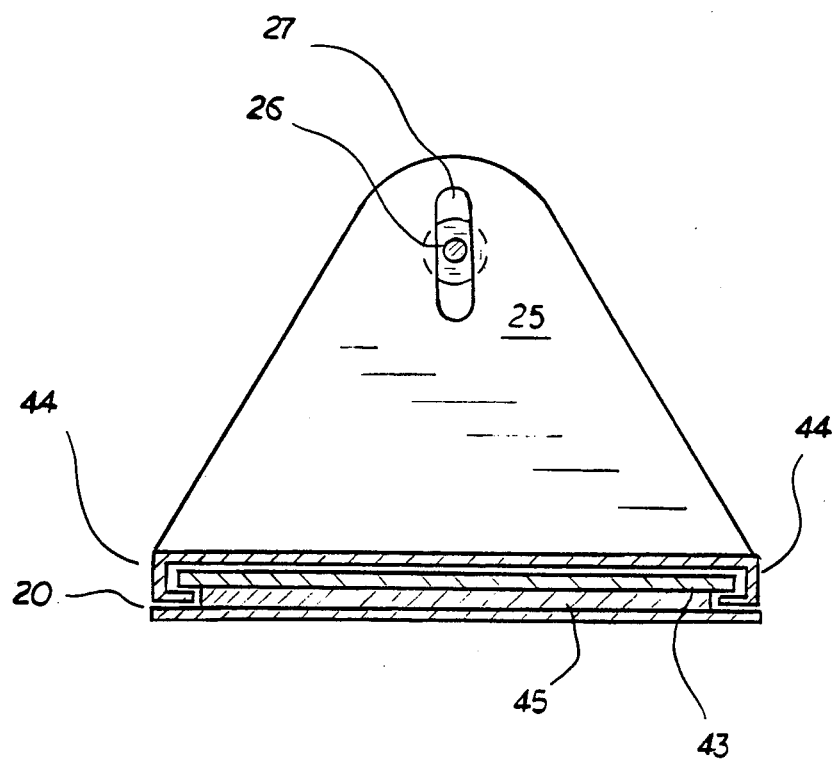
FIG. 5 is a fragmentary top view of an alternative embodiment of the headgear.
Figure 6:
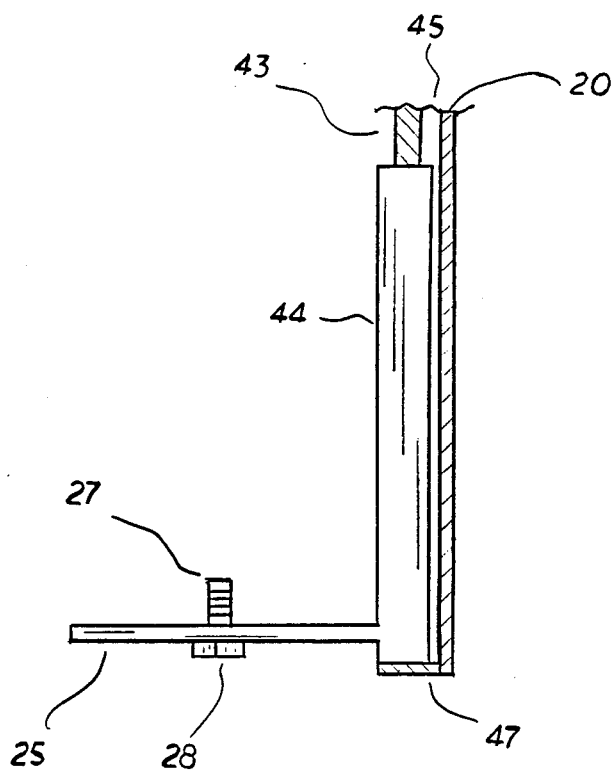
FIG. 6 is a fragmentary front view of the alternative embodiment of FIG. 5.

In the alternative embodiment shown in FIGS. 5 and 6, shelf panel 25, instead of being integral with side panel 20 is slidable thereon The sliding movement is controlled by paired vertically elongated track members 44 positioned at opposite lateral extremities of panel 25 and integral therewith. Said track members are adapted to slidably engage the lateral extremities of vertically elongated engagement plate 43 which is attached to side panel 20 through spacer panel 45. The slidable embodiment of shelf Panel 25 may either be adjustably locked at different elevations upon side panel 20, or may be adapted to rest upon stopping means 47 that may be associated with lower extremity 22 of panel 20.

In use, the headgear is placed upon the wearer's head without the camera attached The forehead strap 15 is adjusted so that side panel 20 is substantially centered upon the wearer's ear. Rear strap 14 is adjusted so that it fits fairly loosely. Buckle 37 is then unsnapped, and the headgear is removed from the wearer's head. The camera is then mounted upon shelf panel 25, using bolt 27 that enters the tripod socket in the base of the camera, the camera being positioned as close as possible to side panel 20. The headgear is then placed on the wearer's head, buckle 37 is re-connected, and the free end of strap 14 is pulled upon until it tightens in contact with the back of the head. Chin strap 16 is then snapped together at its buckle 39, and similarly tightened.

To remove the headgear, buckles 37 and 39 are unsnapped. The front retaining strap 15 need not be unsnapped at its buckle following its initial adjustment.

In the case of the alternative embodiment of FIGS. 5 and 6, the headgear would be worn as previously described, except that shelf panel 25 would be attached to the camera, and would be brought into slidable engagement with plate 43 when the photographer was ready to begin filming. When not filming, or filming with the camera held in the hands, shelf panel 25 would remain attached to the camera, while the headgear could remain on the head, ready for immediate use.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A headgear device for mounting a camera substantially at eye level comprising:
   (a) a frame having an elongated arcuate portion adapted to fit over the top of the wearer's head, a flat side panel having opposed outer and inwardly directed surfaces and upper and lower extremities, said upper extremity being emergent from said arcuate portion as a continuous integral extension thereof in a manner permitting resilient movement of said arcuate portion, and a shelf panel positioned perpendicularly and connected to said side panel and adapted to be disposed in a horizontal orientation when in use, said shelf panel having a positioning slot elongated in the direction of said side panel and a threaded bolt adapted to more within said positioning slot and secure a camera to said shelf, and strap-holding slots disposed within said side panel and arcuate portion,
   (b) a first retaining strap of adjustable length adapted to lie against the wearer's forehead and engaging said strap-holding slots,
   (c) a second retaining strap of adjustable length adapted to lie against the rear of the wearer's head and engaging said strap-holding slots, and (d) a third retaining strap of adjustable length adapted to lie beneath the chin of the wearer and engaging said strap-holding slots.

2. The device of claim 1 wherein said frame is of monolithic construction, said shelf panel being emergent from the lower extremity of said side panel.

3. The device of claim 1 wherein said shelf panel is slidably positionable upon said side panel in a vertical path, but coming to rest at the lower extremity of said side panel.

4. The device of claim 1 wherein the resiliency of the arcuate portion with respect to the side panel is achieved by perforations located adjacent the upper extremity of the side panel.

5. The device of claim 1 wherein padding is disposed upon the inwardly directed surface of said side panel and positioned to contact the ear of the wearer.

6. The device of claim 1 wherein said arcuate portion has a lower, inwardly directed surface which carries padding positioned to contact the head of the wearer.

7. The device of claim 1 wherein said arcuate portion extends between a proximal extremity that merges with said side panel, and a downwardly directed free distal extremity, the amount of curvature in said arcuate portion being about 180 degrees, whereby the proximal and distal extremities are disposed in diametrically opposed facing relationship.

8. The device of claim 7 wherein the strap-holding slots in said arcuate portion are disposed in said distal extremity and are comprised of paired diagonal slots, a vertical slot centered between said diagonal slots, and a second pair of horizontally disposed slots centered below said vertical slot.

9. The device of claim 1 wherein said straps are equipped with quick-release buckles.

10. The device of claim 1 wherein the strap-holding slots in said side panel comprise two upper vertical slots, two lower slots in vertical alignment with said upper slots, and a first pair of horizontal slots disposed midway between said lower slots.

* * * * *